(12) United States Patent
Chuang

(10) Patent No.: US 11,141,016 B2
(45) Date of Patent: Oct. 12, 2021

(54) TUBE CONNECTOR

(71) Applicants: ABO WINDOW FASHION CORP, Chino, CA (US); Shan-Chi Chuang, New Taipei (TW)

(72) Inventor: Shan-Chi Chuang, New Taipei (TW)

(73) Assignees: ABO WINDOW FASHION CORP., Chino, CA (US); Shan-Chi Chuang, New Taipei (TW)

( * ) Notice: Subject to any disclaimer, the term of this patent is extended or adjusted under 35 U.S.C. 154(b) by 171 days.

(21) Appl. No.: 16/658,805

(22) Filed: Oct. 21, 2019

(65) Prior Publication Data

US 2020/0355307 A1    Nov. 12, 2020

(30) Foreign Application Priority Data

May 8, 2019  (TW) .................................. 108205784

(51) Int. Cl.
*A47H 1/022*   (2006.01)
*F16B 7/04*    (2006.01)
*F16L 33/30*   (2006.01)
*F16L 33/213*  (2006.01)
*A47H 1/02*    (2006.01)

(52) U.S. Cl.
CPC ..... *A47H 1/022* (2013.01); *A47H 2001/0215* (2013.01); *F16L 33/213* (2013.01); *F16L 33/30* (2013.01); *Y10T 403/557* (2015.01)

(58) Field of Classification Search
CPC ..... F16L 33/213; F16L 33/30; Y10T 403/557; F16B 7/0413; F16B 7/042; A47H 1/022; A47H 2001/0215
See application file for complete search history.

(56) References Cited

U.S. PATENT DOCUMENTS

| 4,068,346 A * | 1/1978 | Binder ..................... B25G 1/04 |
| | | 15/159.1 |
| 4,152,086 A * | 5/1979 | Achenbach .............. B25G 3/28 |
| | | 403/334 |
| 7,186,050 B2 * | 3/2007 | Dean ....................... F16B 7/025 |
| | | 403/344 |
| 10,426,287 B1 * | 10/2019 | Tsai ........................ A47H 1/022 |
| 2012/0103924 A1 * | 5/2012 | Chuang .................. A47H 13/02 |
| | | 211/123 |

FOREIGN PATENT DOCUMENTS

WO    WO-2014083597 A1 *  6/2014  ............. F16H 25/24

* cited by examiner

*Primary Examiner* — James M Hewitt, II

(57) ABSTRACT

A tube connector has a connecting member and two tightening sleeves. The connecting member has a circular shaft portion, and two ends of the circular shaft portion respectively have a cone-shaped stud with a threaded section. Each cone-shaped stud has a socket, and the socket has a positioning end larger than an outer diameter of the socket. The tightening sleeves respectively jacket onto two ends of the connecting member, an end of each tightening sleeve has a tapered screw hole, and another end has a through aperture connecting to the taper screw hole.

5 Claims, 11 Drawing Sheets

TUBE CONNECTOR

BACKGROUND OF INVENTION

Field of Invention

The present invention relates to a connector, and more particularly to a tube connector.

Description of the Related Art

Currently, there are commonly used assemblies such as a frame or a structure formed by tube connections, and the connections between the tubes are mostly connected by an inner or outer tube, or a neck end is provided at one end of the tube for insertion combination. When the inner and outer tubes are socketed, it must be secured by the buckle or the revolving method. Due to the telescopic displacement between the inner and outer tubes, the inner and outer tubes are easy to be separated by gravity pressurization and sliding loose. Secondly, when the two tubes are connected by an insertion connection, the two tubes will be pulled out and dismantled after being pulled outward. Therefore, it is necessary to utilize the buckle and the positioning hole to achieve the positioning state of the two tubes. However, the strength of the buckle is insufficient, and it is easy to have a deformed condition, which causes inconvenience in use. Therefore, the above two tubes are inconvenient. The connections between the two tubes need improvement.

Therefore, it is desirable to provide a tube connector to mitigate and/or obviate the aforementioned problems.

SUMMARY OF THE INVENTION

An objective of present invention is to provide a tube connector, which is capable of improving the above-mention problems.

In order to achieve the above mentioned objective, a tube connector has a connecting member and two tightening sleeves. The connecting member has a circular shaft portion, and two ends of the circular shaft portion respectively have a cone-shaped stud with a threaded section. Each cone-shaped stud has a socket, and the socket has a positioning end larger than an outer diameter of the socket. The tightening sleeves respectively jacket onto two ends of the connecting member, an end of each tightening sleeve has a tapered screw hole, and another end has a through aperture connecting to the taper screw hole.

Other objects, advantages, and novel features of invention will become more apparent from the following detailed description when taken in conjunction with the accompanying drawings.

DETAILED DESCRIPTION OF THE PREFERRED EMBODIMENT

Figure 1:
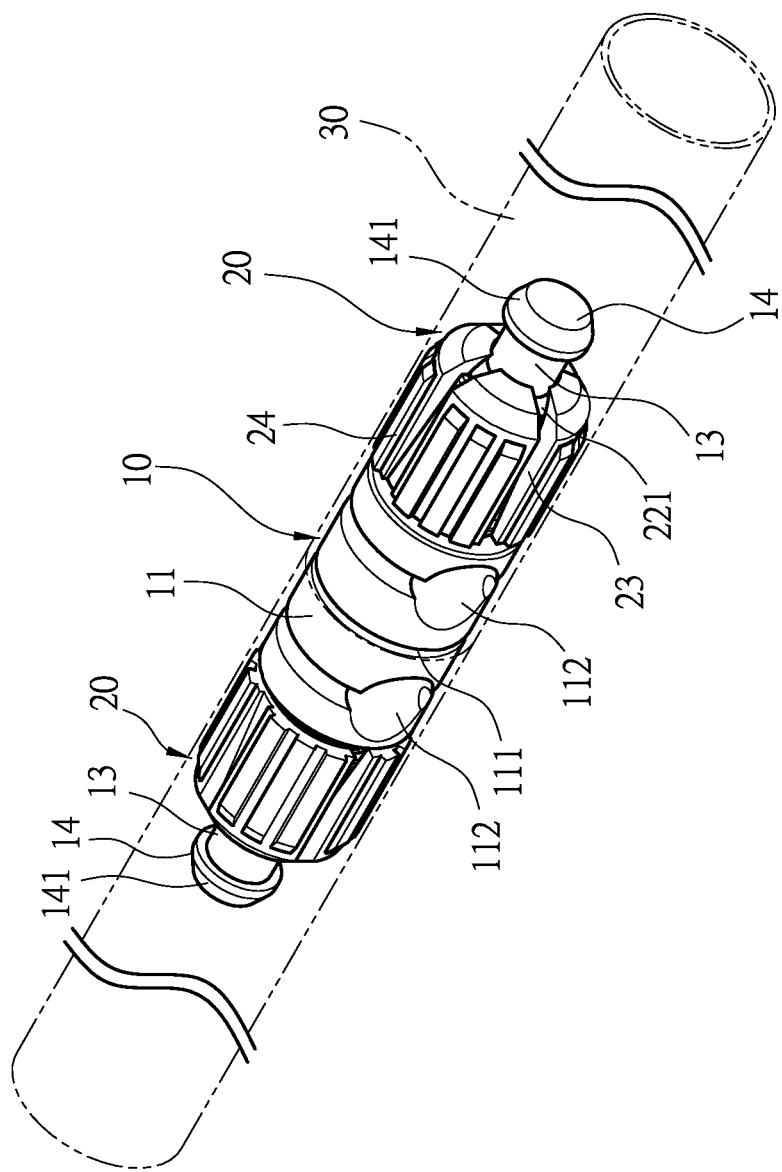
FIG. 1 is a perspective view of a preferred embodiment according to the present invention.
Figure 2:
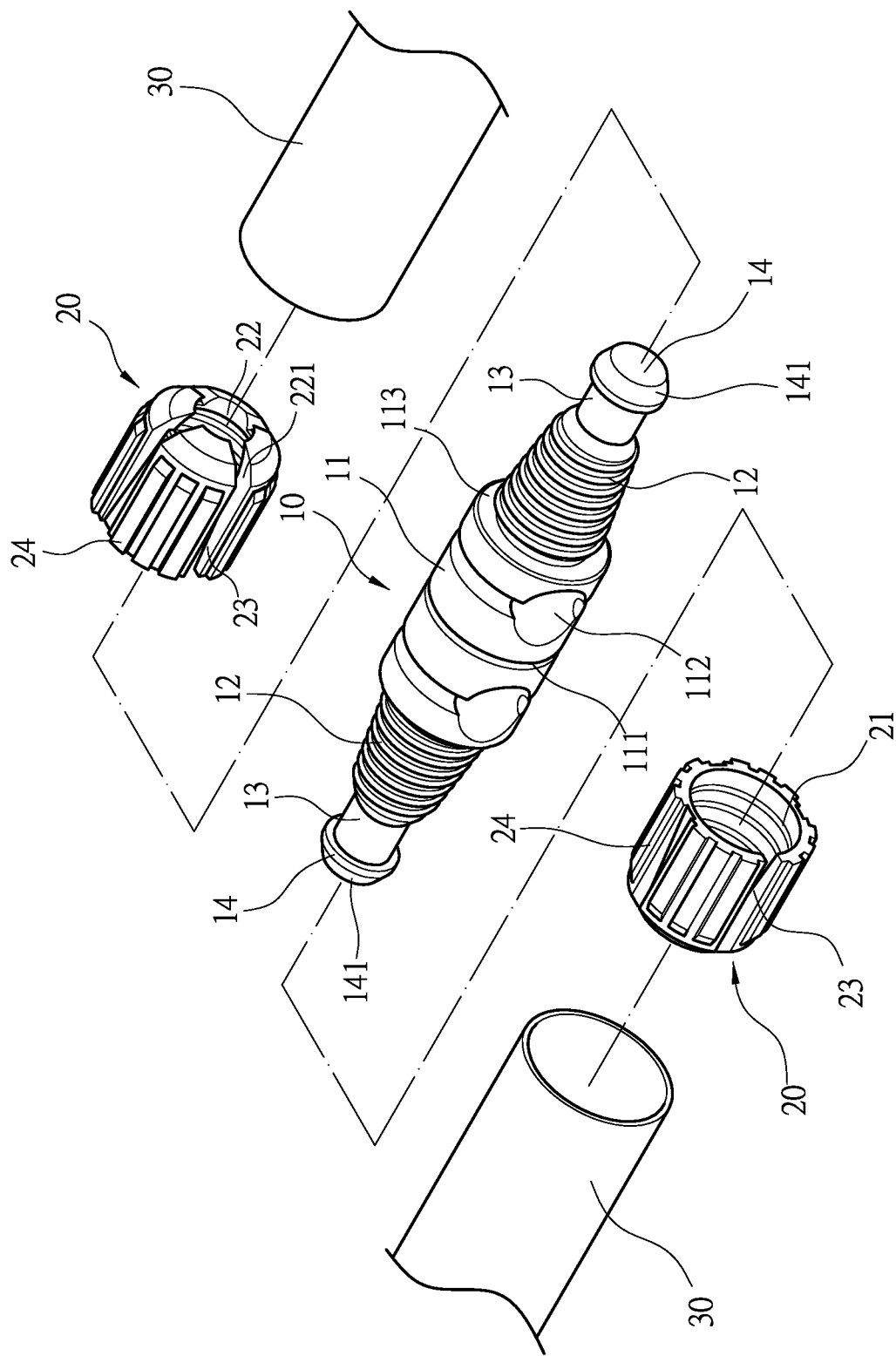
FIG. 2 is an exploded view of the preferred embodiment according to the present invention.

Please refer to FIGS. 1-4. A tube connector comprises: a connecting member 10 and two tightening sleeves 20. The connecting member 10 is provided with a circular shaft portion 11, two ends of the circular shaft portion 11 respectively have a cone-shaped stud 12 with a threaded section. A largest diameter of the cone-shaped stud 12 is smaller than a diameter of the circular shaft portion 11, and two ends of the circular shaft portion 11 are respectively provided with a baffle portion 113. Each cone-shaped stud 12 has a socket 13, and the socket 13 has a positioning end 14 larger than an outer diameter of the socket 13. Each positioning end 14 comprises an inclined lip 141. The tightening sleeves 20 respectively jackets onto two ends of the connecting member 10, an end of each tightening sleeve 20 comprises a tapered screw hole 21 and another end comprising a through aperture 22 connecting to the taper screw hole 21. The through aperture 22 is connected to a plurality of radially disposed extending slots 221, each tightening sleeve further has at least one groove 23 connecting to at least one of the extending slots 221, and the groove further connecting to the tapered screw hole. The tightening sleeve 20 further comprises a plurality of ribs 24 on its periphery.

Figure 3:
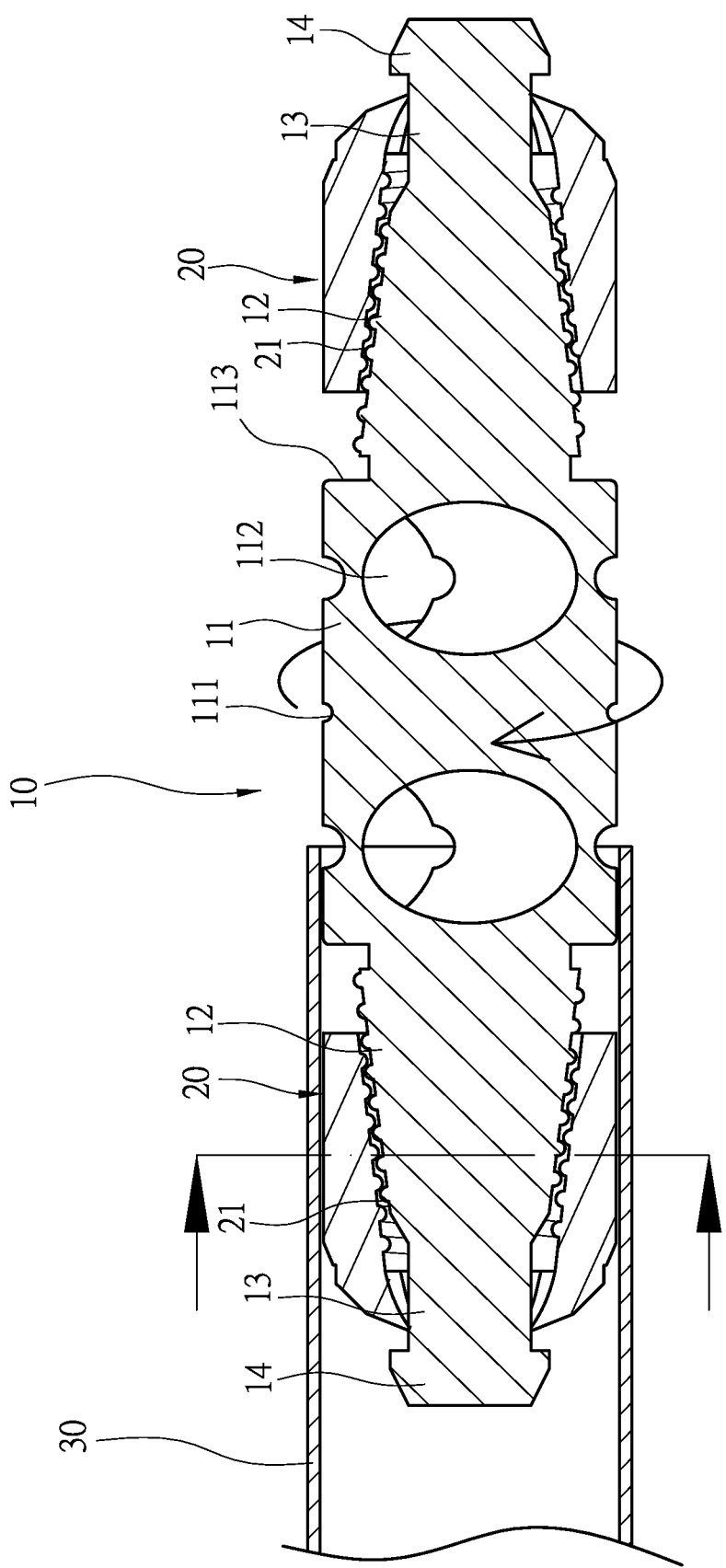
FIG. 3 is an assembled cross-sectional view of the preferred embodiment according to the present invention.
Figure 4:
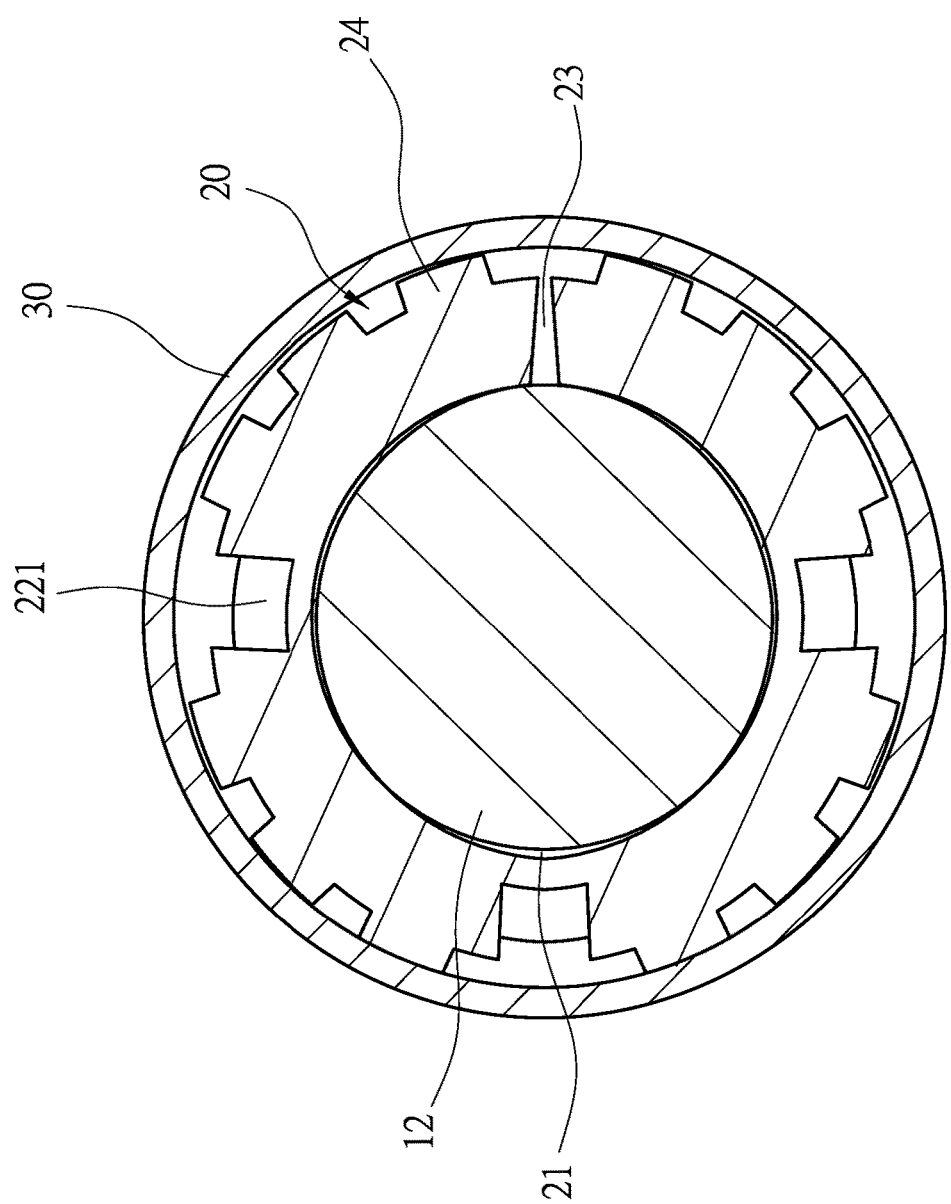
FIG. 4 is a cross-sectional view of the cone-shaped stud and the tightening sleeve before being tightening according to the present invention.
Figure 5:
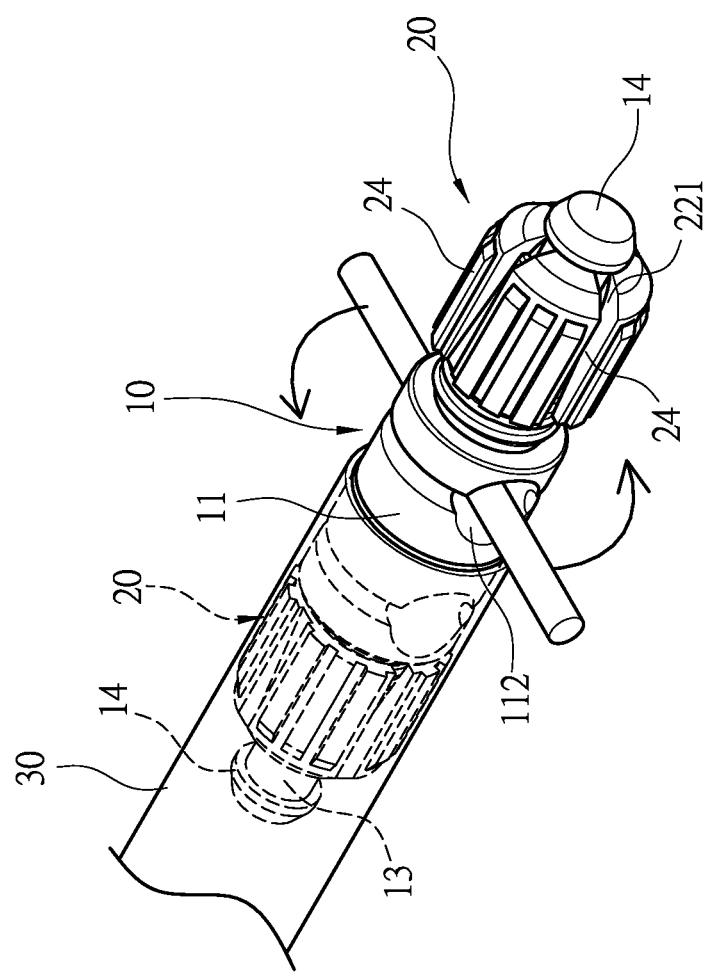
FIG. 5 is a three-dimensional drawing of the combination of the preferred embodiment and a connecting rod according to the present invention.
Figure 6:
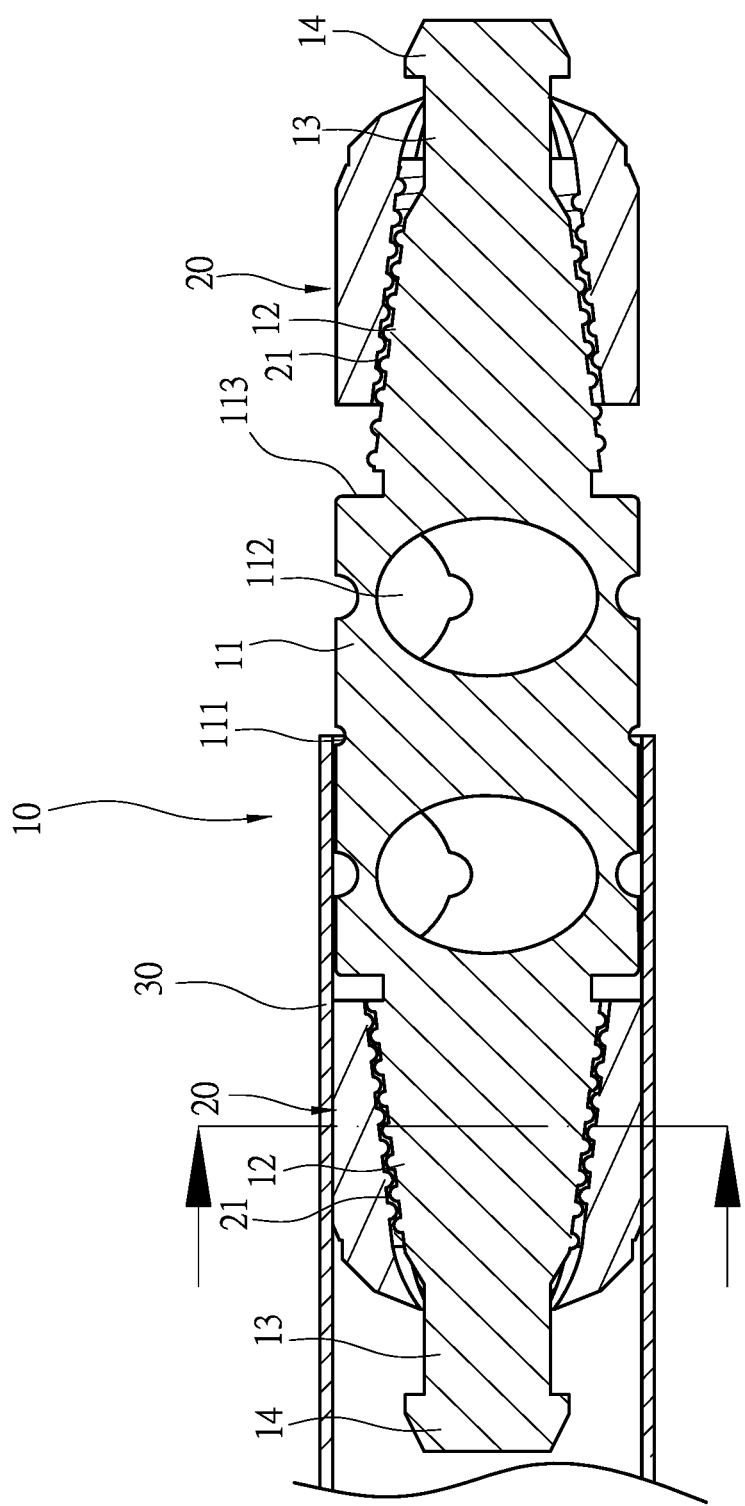
FIG. 6 is a cross-sectional view showing the cone-shaped stud and the tightening sleeve of the preferred embodiment being tighten according to the present invention.
Figure 7:
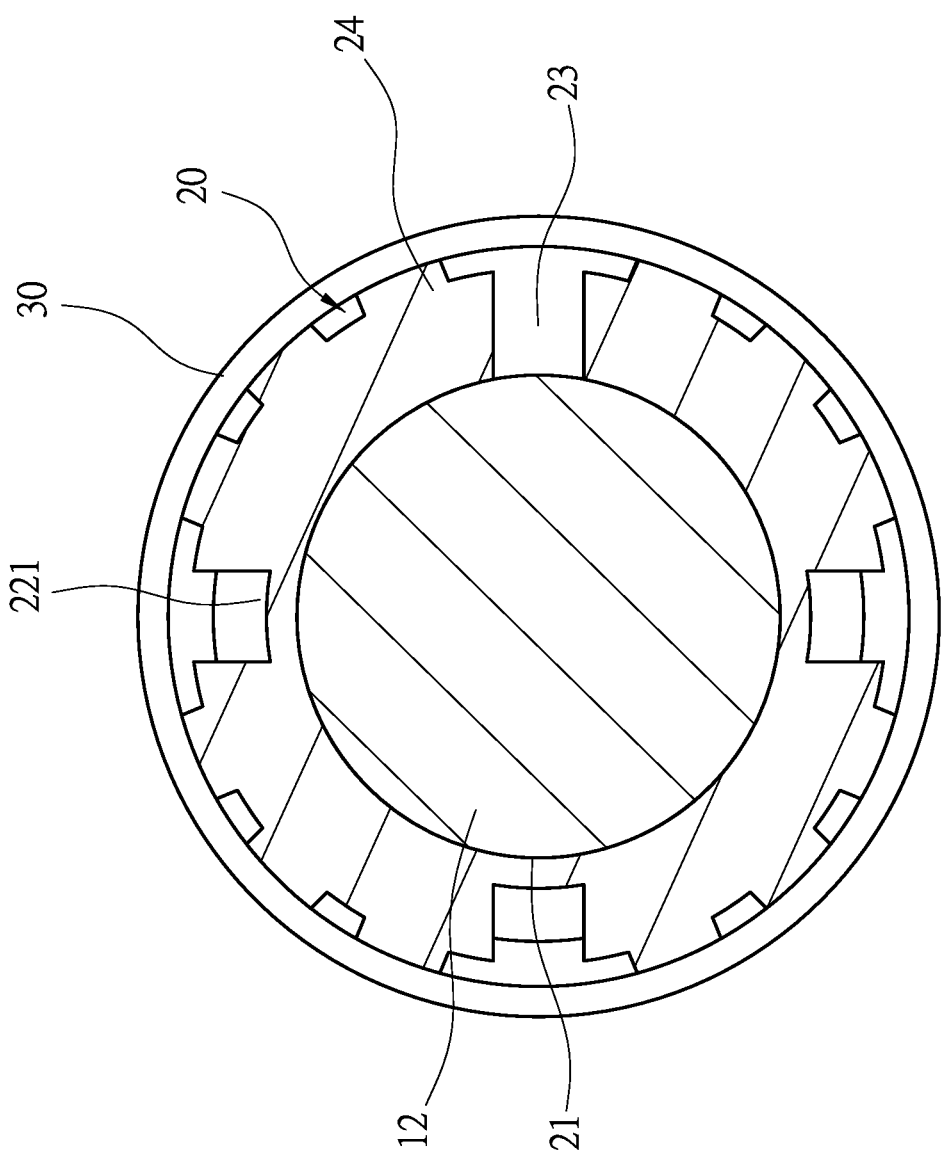
FIG. 7 is another cross-sectional view showing the cone-shaped stud and the tightening sleeve of the preferred embodiment being tighten according to the present invention.
Figure 8:
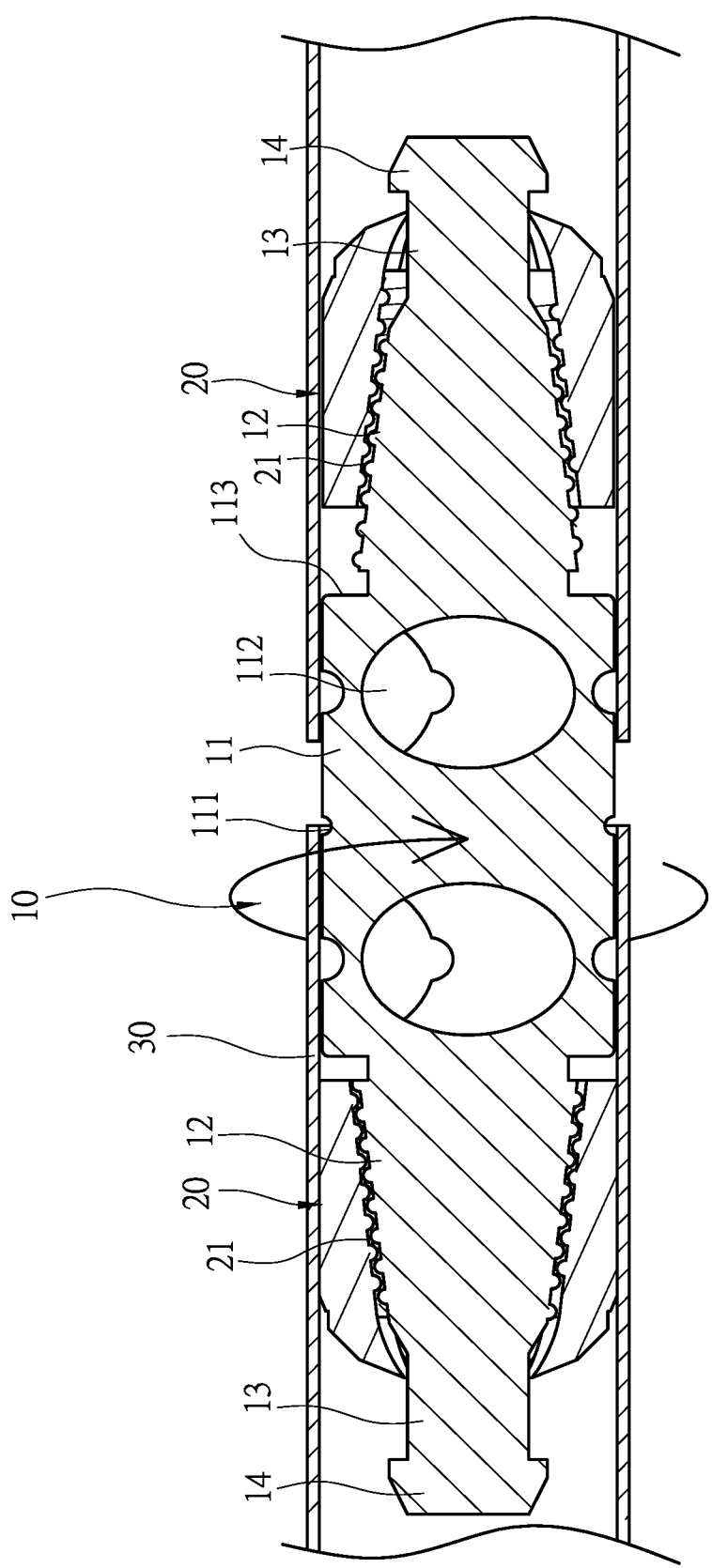
FIG. 8 is a schematic view showing another end of the connecting member being assembled into another tube of the present invention.
Figure 9:
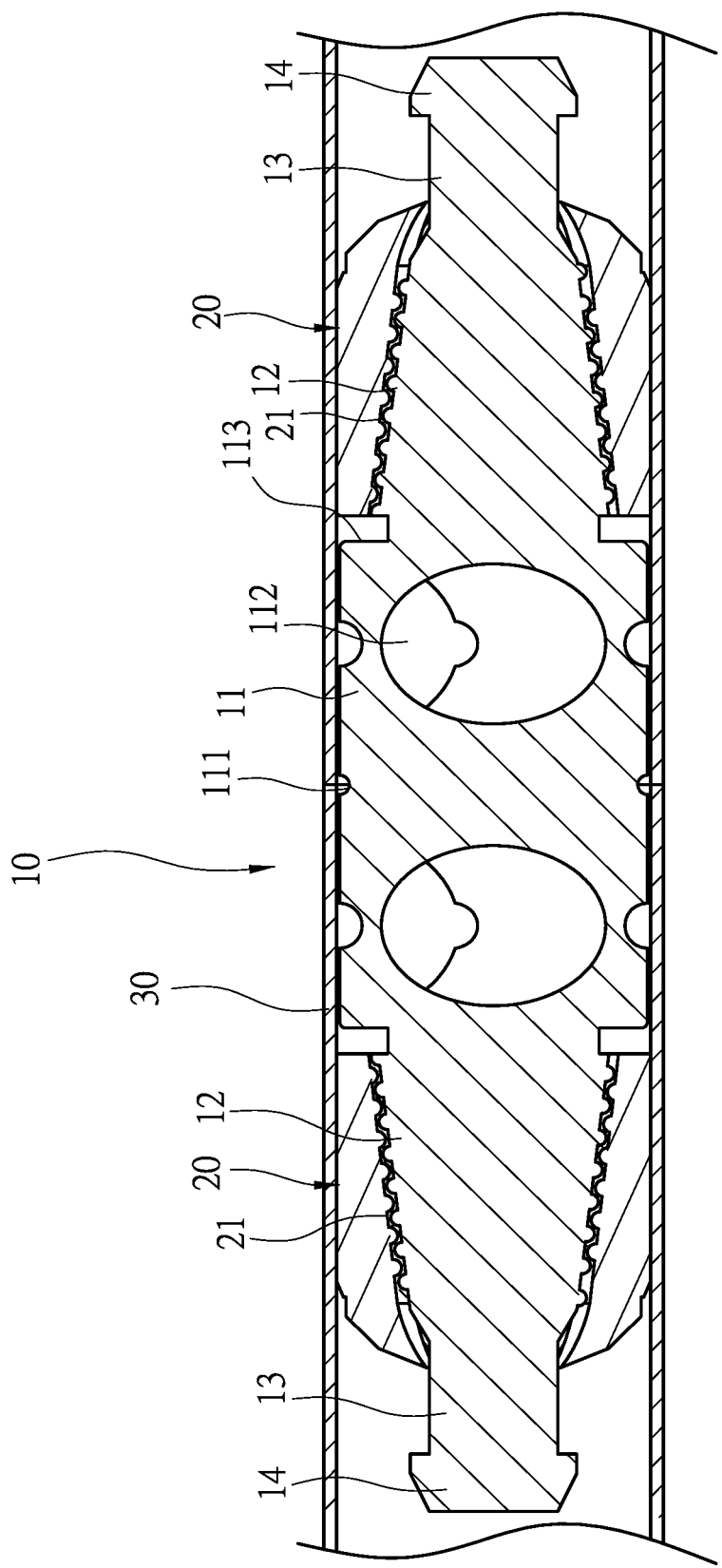
FIG. 9 is a cross-sectional view showing the connection of the connecting member to the two tubes according to the present invention.

For actual operation, please refer to FIGS. 3 and 4 with FIGS. 6, 7, 8, and 9. The cone-shaped studs 12 on both ends of the connecting member 10 are screwed and sleeved with a tightening sleeve 20, and the threaded section 13 and the positioning end 14 of the cone-shaped stud 12 protrude from the through aperture 22 of the tightening sleeve 20. An outer diameter of the positioning end 14 is greater than the through aperture 22 and provides positioning for the tightening sleeve 20. To assembly the tube connector, one end of the connecting member 10 is first inserted into a tube 30, and the connecting member 10 is rotated to make the cone-shaped stud 12 locked with the taper screw hole 21 of the tightening sleeve 20. With the tapered structure and the design of the groove 23, the tightening sleeve 20 is gradually stretched to open, and the ribs 24 make contact with the inner wall of the tube 30. When the connecting member 10 is rotated, a rod can also be inserted into the through hole 112 of the circular shaft portion 11, as shown in FIG. 5, to help to rotate the connecting member 10 to achieve a better tightening state. After this end of the connecting member 10 is secured, the other end can be assembled into another tube 30, and the fixed tube 30 is rotated to drive the connecting member 10 to rotate, so the cone-shaped stud 12 at the other end of the connecting member 10 is gradually locked into the taper screw hole 21 of the tightening sleeve 20 and then tightly expanded in the other tube 30. Therefore, the combination of the two tubes 30 is finished, and the connection extension of the tube is completed.

Figure 10:
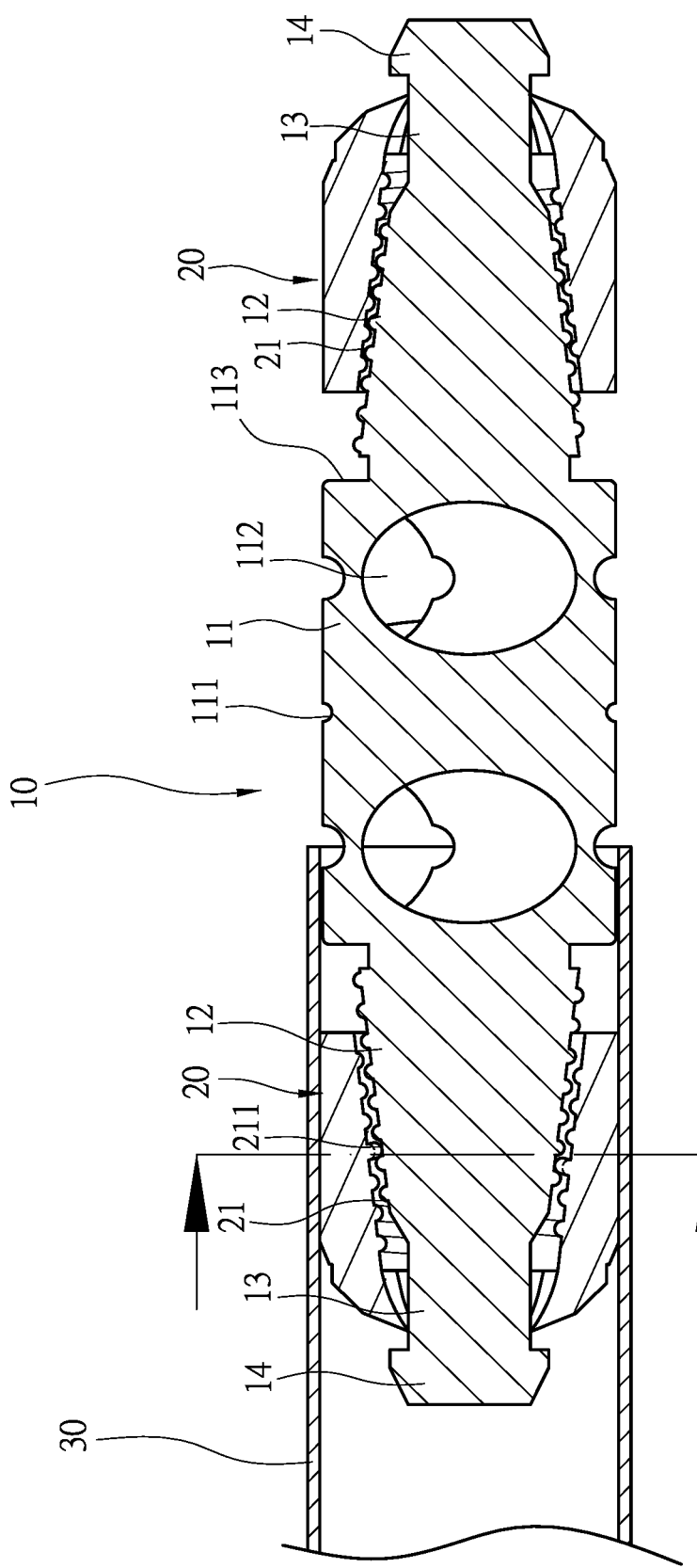
FIG. 10 is a cross-sectional view of another embodiment of the present invention.
Figure 11:
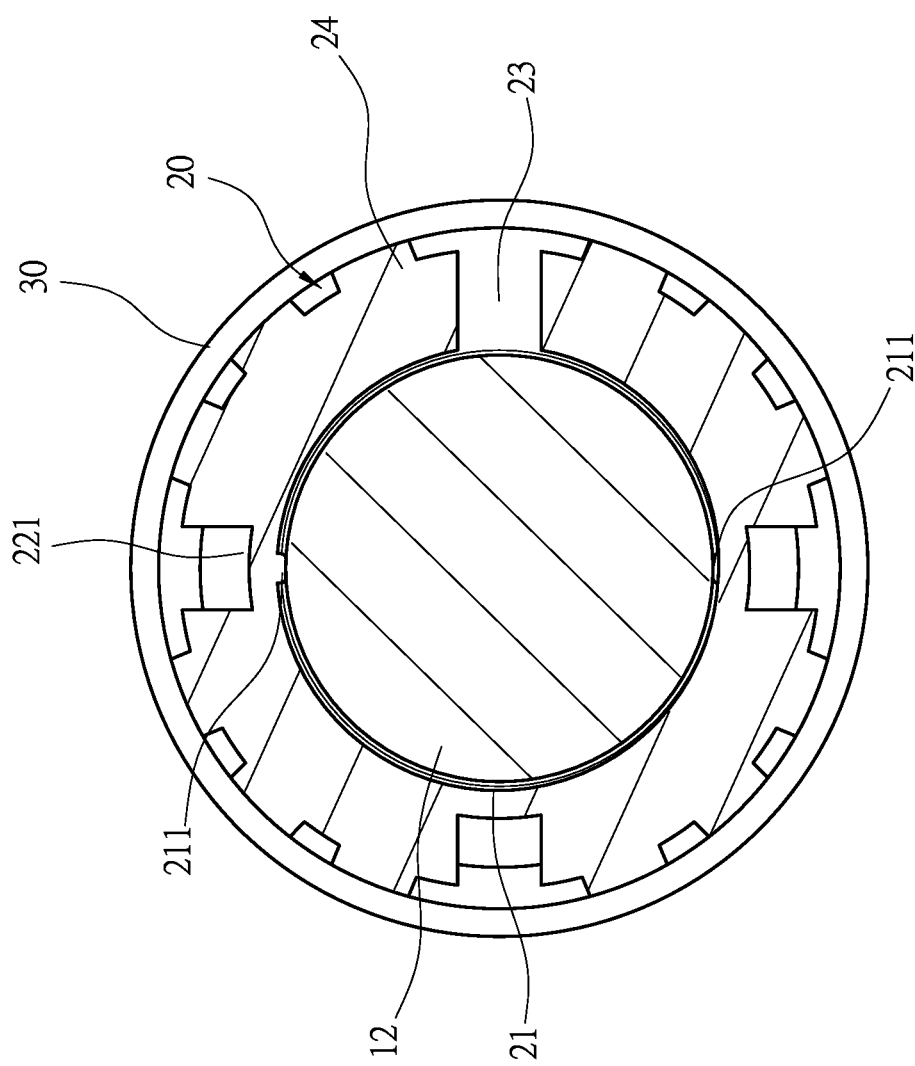
FIG. 11 is another cross-sectional view of another embodiment of the present invention.

Furthermore, in another embodiment of the structure, as shown in FIGS. 10 and 11, the tightening sleeve 20 is symmetrically provided with two positioning protrusions 211 protruding at the middle of the taper screw hole 21. The positioning protrusions 211 are located at the threaded section, so that when the connecting member 10 is locked by rotating, the distance of the tightening sleeve 20 can be increased due to the positioning protrusion 211, so the travel distance of the cone-shaped stud 12 of the connecting member 10 can be shortened. Therefore, it reduces the number of rotation of the connecting member 10 to achieve a fast tightening effect.

With the structure of the above specific embodiment, the following benefits can be obtained: the cone-shaped studs 12 at the ends of the connecting member 10 are respectively coupled with a tightening sleeve 20, and the tightening sleeve 20 has the taper screw hole 21 corresponding to the cone-shaped studs 12, the groove 23 and the extending slot 221. In result, the tightening sleeve 20 might have contraction and expansion under the rotation of the cone-shaped stud 12, and by rotating and tightening to reach the connection of the two tubes 30. Moreover, the end edges of the two tubes 30 will be abutted after the connection, to avoid the loosening of the tube 30, to ensure stable connection of the two tubes 30, and to enhance the strength and stability of the connection of the two tubes 30.

Although the present invention has been explained in relation to its preferred embodiment, it is to be understood that many other possible modifications and variations can be made without departing from the spirit and scope of invention as hereinafter claimed.

What is claimed is:

1. A tube connector comprising: a connecting member and two tightening sleeves, the connecting member comprising a circular shaft portion, two ends of the circular shaft portion respectively having a cone-shaped stud with a threaded section, each cone-shaped stud having a socket, the socket having a positioning end larger than an outer diameter of the socket, the tightening sleeves respectively jacketing onto two ends of the connecting member, an end of each tightening sleeve comprising a tapered screw hole and another end comprising a through aperture connecting to the taper screw hole; each through aperture connected to a plurality of radially disposed extending slots, each tightening sleeve further having at least one groove connecting to at least one of the extending lots, the groove further connecting to the tapered screw hole; the circular shaft portion of the connecting member has a central groove, wherein the central groove has a through hole on each side.

2. The tube connector as claimed in claim 1, wherein a largest diameter of each cone-shaped stud is smaller than a diameter of the circular shaft portion, and two ends of the circular shaft portion are respectively provided with a baffle portion.

3. The tube connector as claimed in claim 1, wherein each positioning end comprises an inclined lip.

4. The tube connector as claimed in claim 1, wherein each tightening sleeve further comprises a plurality of ribs.

5. The tube connector as claimed in claim 1, wherein each tightening sleeve further comprises two positioning protrusions symmetrically protruding from a middle section of the tapered screw hole, and the two positioning protrusions respectively comprise a threaded section.

* * * * *